C. A. SMITH.
Finger-Bars for Harvesters.

No. 135,495. Patented Feb. 4, 1873.

Witnesses.
W. R. Odlin
Robt. Talbott

Inventor.
Charles Abbott Smith
By his Atty. J. Dennis Jr.

UNITED STATES PATENT OFFICE.

CHARLES A. SMITH, OF NAPA, CALIFORNIA.

IMPROVEMENT IN FINGER-BARS FOR HARVESTERS.

Specification forming part of Letters Patent No. 135,495, dated February 4, 1873.

*To all whom it may concern:*

Be it known that I, CHARLES ABBOTT SMITH, of the city and county of Napa, in the State of California, have invented certain Improvements in Harvesters, of which the following is a specification:

My invention relates to the construction of finger-bars and guard-fingers for harvesting-machines and the mode of fastening the guard-fingers in the finger-bar.

Figure 1:
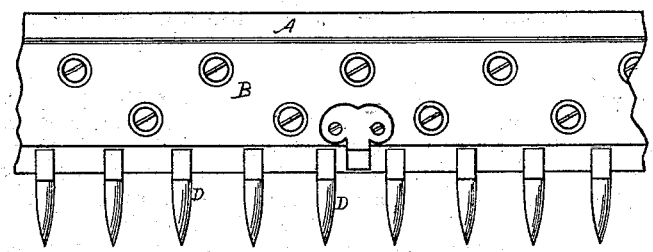
Figure 2:
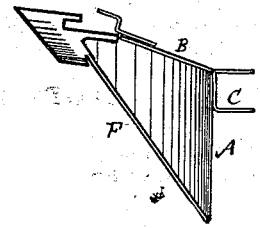
Figure 3:
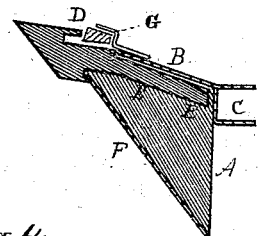
Figure 4:
Figure 5:

Figure 1 is a plan or top view of a finger-bar with my improvements; Fig. 2 is an end view of the same; Fig. 3 is a vertical section; and Figs. 4 and 5 are an elevation and plan of one of the guard-fingers.

In the above-mentioned drawing, A is the finger-bar, having its upper surface inclined from front to rear, and grooved across to receive the square shanks of the guard-fingers D D, which are fitted to the grooves E E, and the plate B of metal is applied on them and fastened to the beam A with bolts or screws to clamp the shanks of the guard-fingers fast and hold them firmly without other fastening.

C is a draper's rest or guide for the edge of the apron which carries the grain from the platform. G is the bar to which the sickle teeth or cutters are fastened. F is a plate of metal fastened to the under side of the beam A to strengthen it.

By turning back the screws which fasten the plate B on the finger-bar the guard-fingers D D are loosened so as to be easily removed and replaced, and fastened again by turning in the screws so as to clamp the shanks of the guard-fingers tight in the grooves of the finger-bar and hold them fast.

I claim—

The combination and arrangement of the grooved finger-bar A with the clamping-plate B fastened to the bar with screws, so as to clamp the guard-fingers D D in the grooves of the finger-bar and hold them firmly without other fastening.

CHARLES ABBOTT SMITH.

Witnesses:
JAMES H. GOODMAN,
GEORGE E. GOODMAN.